Jan. 31, 1961   L. H. CORREC   2,970,097
NUCLEAR REACTORS INCLUDING HORIZONTAL GRAPHITE BARS
Filed June 12, 1956   3 Sheets-Sheet 1

Jan. 31, 1961 L. H. CORREC 2,970,097
NUCLEAR REACTORS INCLUDING HORIZONTAL GRAPHITE BARS
Filed June 12, 1956 3 Sheets-Sheet 2
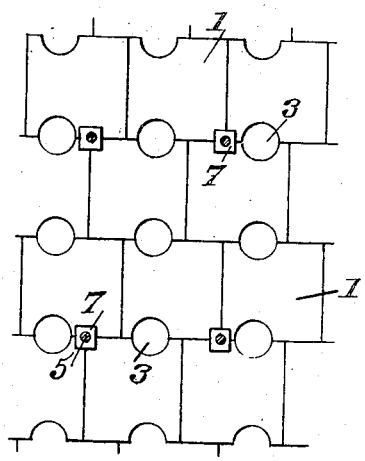
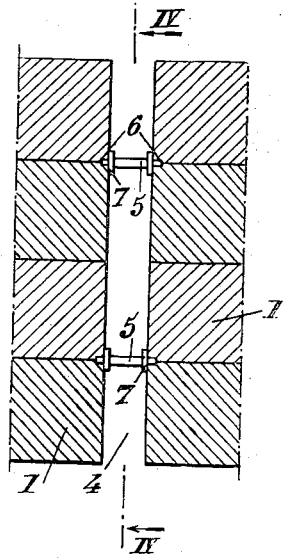
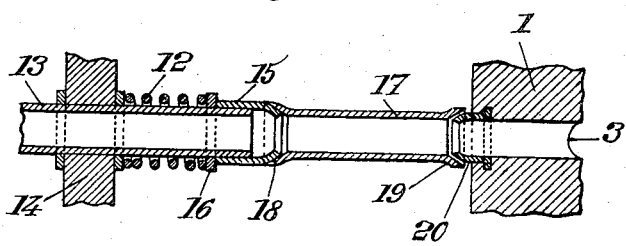

Jan. 31, 1961    L. H. CORREC    2,970,097
NUCLEAR REACTORS INCLUDING HORIZONTAL GRAPHITE BARS
Filed June 12, 1956    3 Sheets-Sheet 3

INVENTOR
LAZARE HENRI CORREC

United States Patent Office 2,970,097
Patented Jan. 31, 1961

2,970,097
NUCLEAR REACTORS INCLUDING HORIZONTAL GRAPHITE BARS

Lazare Henri Correc, Paris, France, assignor to Commissariat à l'Energie Atomique, Paris, France, a society of France Filed June 12, 1956, Ser. No. 590,920

Claims priority, application France June 16, 1955

16 Claims. (Cl. 204—193.2)

The present invention relates to nuclear reactors which comprise a multiplicity of juxtaposed parallel contiguous rows of horizontal graphite bars, each row consisting of a plurality of bars disposed end to end, the whole of said rows forming a graphite block provided with a multiplicity of horizontal channels parallel to said rows of bars for housing slugs of fissionable material, said block being supported by suitable means on the ground and being surrounded by a shielding structure fixed to the ground. Such a graphite-moderated reactor of the gap type is described, for instance, in chapter 6 of the publication "Selected Reference Material, United States Atomic Energy Program, Research Reactors, TID 5275.

The object of my invention is to provide a reactor of this kind which is better adapted to meet the requirements of practice than those known at the present time and in particular one in which the graphite bars are firmly but resiliently maintained in the desired position despite the expansion actions they undergo.

According to my invention, resilient means are interposed between said fixed structure and the ends of said rows of bars located near said structure, said resilient means being strong enough to overcome the friction forces between the bars of each row and the rows of bars adjoining said row.

Advantageously, said rows of bars are disposed by pairs, the two rows of a pair being in line with each other, with an interval between their adjacent ends, all the intervals in said pairs of rows of bars being in register so as to form a vertical gap extending transversely to said block. In this case, according to my invention, struts are interposed between the rows of bars disposed on opposite sides of said gap respectively so as to maintain said gap against the thrust exerted by said resilient means.

Other features of my invention will become apparent in the course of the following detailed description of some specific embodiments thereof with reference to the accompanying drawings, given merely by way of example and in which:

Fig. 3 is a section of a portion of the reactor by a plane at right angles to the transverse gap provided in the graphite block.

Fig. 4 is a sectional view on the line IV—IV of Fig. 3.

Fig. 5 is a sectional view on the line V—V of Fig. 2.

Figure 1:
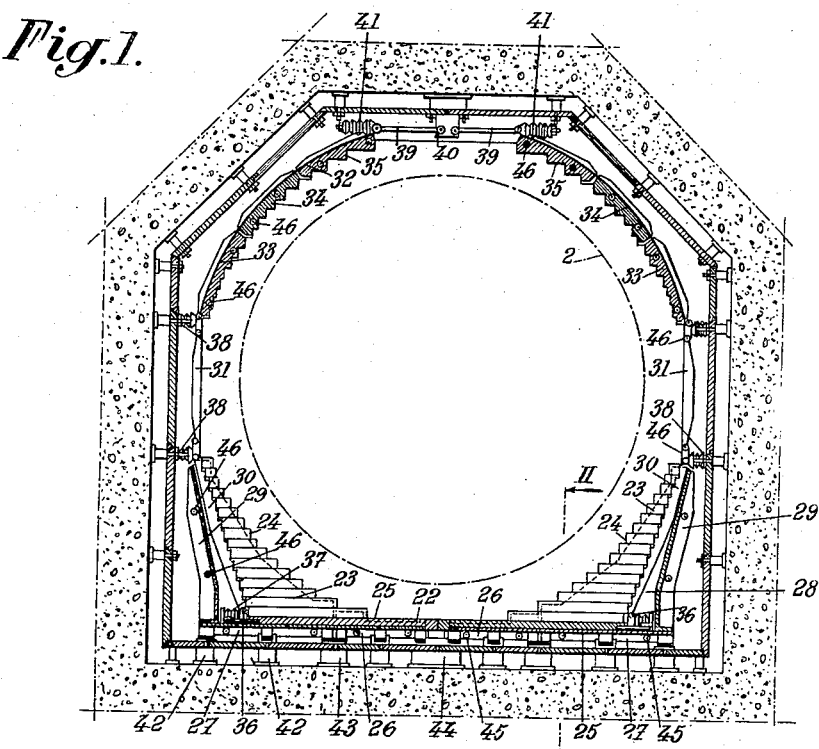
Fig. 1 is a vertical sectional view at right angles to the direction of the graphite bars of the reactor.

The nuclear reactor illustrated by the drawings includes a graphite block constituted by a multiplicity of graphite bars 1. In the central portion of this block, diagrammatically limited by an outline such as visible at 2 on Fig. 1, there is provided a multiplicity of channels 3 intended to receive uranium bars. As visible on Fig. 4, these channels are intersected by the surfaces of contact between the respective layers of graphite bars. Every channel 3 is constituted by the assembly of two longitudinal grooves of semi-circular cross-section.

The reflector of the reactor is constituted by the whole of the graphite bars located between outline 2 and the periphery of said block. Of course, this reflector is not provided with channels intended to receive uranium bars. It may be provided with cooling and measurement channels.

Figure 2:
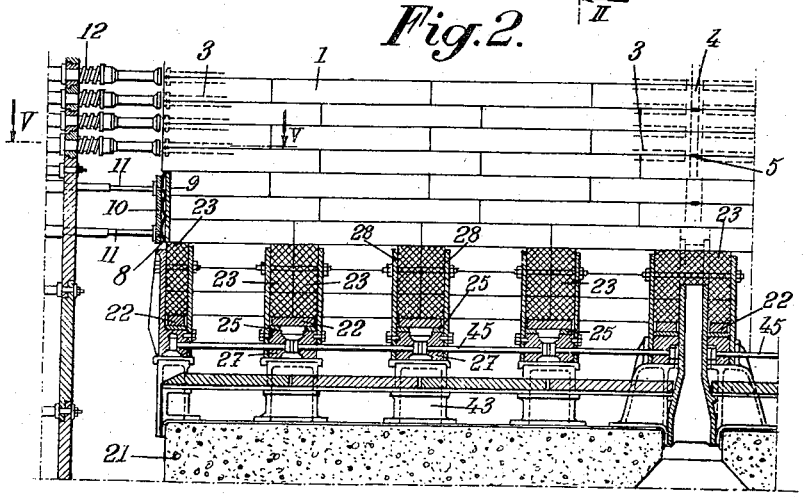
Fig. 2 is a sectional view on an enlarged scale on the line II—II of Fig. 1.

The middle gap 4 (Figs. 2 and 3) is located halfway between the outer ends of the rows of graphite bars and at right angles to said bars. It is fed with cooling gas through means which are not visible on the drawings. Its width, calculated in accordance with the cooling effect to be obtained, is, according to the invention, kept constant by struts 5 made of a material which is both capable of resisting pressure stresses and of absorbing but a little amount of neutrons. Such a material may be for instance beryllium or zirconium.

In order to reduce to a minimum the number of struts 5, each of them is located at a point common to the three graphite bars, as visible on Fig. 4. The ends 6 of struts 5 are slightly engaged into the graphite bars 1 and, in order to ensure a good bearing surface, transverse plates 7 of an area greater than the cross-section of the struts are mounted between the ends of said struts and the corresponding wall of the gap. The ends 6 (of small cross-section) of the struts extend through said plates 7.

Of course, struts 5 do not oppose an increase of the width of gap 4. Such an increase might be particularly important at a given level because the contacting graphite bars mutually drive one another. In order to avoid this drawback, according to the present invention, the graphite bars are subjected, at both ends of the reactor, to the action of springs or other resilient means which push them toward the middle gap 4. The initial force of these springs needs not be very important; it must however be sufficient to overcome the resistances due to friction between the respective layers of graphite bars. These springs may be of different shapes in accordance with the places where they are located.

Figure 6:
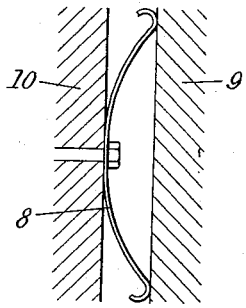
Fig. 6 is an enlarged view of a detail of Fig. 2.

In the portions corresponding to the reflector, it suffices to provide leaf springs 8 disposed between a plate 9 applied against the ends of the graphite bars and a plate 10 carried by small fixed columns 11 (Fig. 6).

However, opposite the portion of the graphite block which is provided with channels intended to receive the uranium bars, it is necessary to provide passages for these last mentioned bars. Each spring 12 is then advantageously incorporated in a hollow telescopic device (Fig. 5) forming a conduit for the uranium bars. This hollow telescopic device includes the end 13 of a conduit extending through the wall 14 of the shield of the reactor. A female conduit 15 is engaged on the end 13 and a spring 12 is interposed between a collar 16 rigid with conduit 15 and wall 14.

Furthermore, in order to make allowance for deformations of the graphite block which tend to place the channels 3 of the block out of alinement with the conduits extending through wall 14, I preferably provide, for every channel 3, a conduit element 17 mounted, through swivel joints 18 and 19, between the female conduit 15 and a connection 20 forming an extension of channel 3.

This telescopic device achieves a satisfactory guiding of the uranium bars between the inside and the outside of the reactor. Its spring 12 constantly urges the graphite bars toward gap 4 the width of which is kept constant by struts 5.

The combination of struts 5 and springs 8 and 12 permits of eliminating the drawbacks due to the elongation of the graphite bars only insofar as the means for fixing the graphite block with respect to the ground do not secure said block longitudinally to such a degree as to deform or deteriorate it.

In view of the fact that gap 4 has a fixed position, the fixation device must in particular permit elongations of the block starting from this gap 4.

Furthermore the fixation means must be of such a nature as to avoid important transverse displacements between the successive layers of graphite bars. As a matter of fact, the channels 3 in which are placed the uranium bars are intersected (Fig. 4) by the surfaces of contact between the layers of graphite bars so that important transverse displacements between said layers would reduce the diameter of these channels and might even wedge the uranium bars therein.

In order to reduce the importance of such transverse displacements, it is advantageous to arrange the means for the fixation of the graphite block in such manner as to maintain a symmetry of these displacements with respect to the longitudinal vertical plane of symmetry of the block. In this way, the magnitude of the relative transverse displacements is divided by two.

To sum up, the means for fixing the block with respect to the ground must be capable of permitting symmetrical expansions with respect both to the gap and to the longitudinal vertical plane of symmetry of the block.

For this purpose, according to the invention, the block rests upon the bottom floor 21 of the shield (Fig. 2) through a metallic support which undergoes expansions of the same order of magnitude as those of the lower portion of the graphite block and in directions symmetrical with respect to the two vertical planes of symmetry of the block.

It may be reasonably assumed that the causes of expansion other than thermal expansion will be negligible in the thickness of the reflector and that, consequently, the portion of the block resting upon the metallic support will undergo practically but thermal expansion. Accordingly the coefficient of thermal expansion of the metallic support must be chosen substantially equal to that of graphite.

For this purpose I may use, for instance, either a ferro-nickel containing 42% of nickel, or mixed elements constituted by portions having different expansion coefficients.

Furthermore, transverse cohesion of the block of bars is obtained by deformable and resilient belts disposed in transverse planes parallel to that of gap 4.

The graphite block, in the form of an octagonal prism, is divided by the transverse gap 4 into two half-blocks. Each half-block is maintained (Fig. 2) by five belts, to wit three double belts and two simple belts (one at each end of the half-block).

The lower portion of every belt is constituted by a horizontal plate 22 extending on either side of the lower horizontal face of the graphite prism. The spaces between this plate 22 and the oblique faces of the prism are filled, inside the belt, by horizontal graphite bars 23 perpendicular to the bars forming the graphite block.

The ends of the bars 23 turned toward the block form steps 24 upon which the peripheral bars of the graphite block are resting.

According to my invention, in order to reduce as much as possible relative sliding displacements due to thermal expansion between plate 22 and the graphite bars, and in order to prevent said bars from being separated from one another, plate 22 is made of a ferro-nickel alloy containing 42% of nickel for instance, having a coefficient of thermal expansion of the same order of magnitude as that of graphite. As this coefficient is low (about $3.5 \times 10^{-6}$), plate 22 has but little tendency to assuming a curvilinear shape if there is a difference of temperature between its two faces.

Plate 22 in turn rests upon a table, for instance of steel, through small plates 25. Each table is constituted by four elements (two of which, designated by 26, are in the central portion and two, designated by 27, in the end portion of the cross-section shown by Fig. 1), in line with one another and mounted on suitable supports.

In order to avoid any deformation of the elements 26 and 27 of the tables, each of these elements rests upon three supports but it is guided only by the middle support and its ends are, on the contrary, free to move with respect to the corresponding supports.

However the tables of the belts located on either side of the gap 4 have their freedom limited. The middle portion of their elements is kept strictly fixed contrary to the elements of the other tables which can move in a direction parallel to the generatrices of the graphite block.

Elements 27 carry, on the one hand, side plates 28 which are intended to keep the graphite bars 23 in position, and on the other hand, an upwardly extending member 29 interconnecting said side plates.

The means for surrounding the graphite blocks consist of girders 30 and 31 and metal ties 32, exerting their action through three shoes 33, 34 and 35.

Of course, girders 30 and 31 and elements 32 are hinged together. Furthermore they are subjected to the action of springs disposed symmetrically with respect to the longitudinal vertical plate of symmetry of the graphite block.

Figure 7:
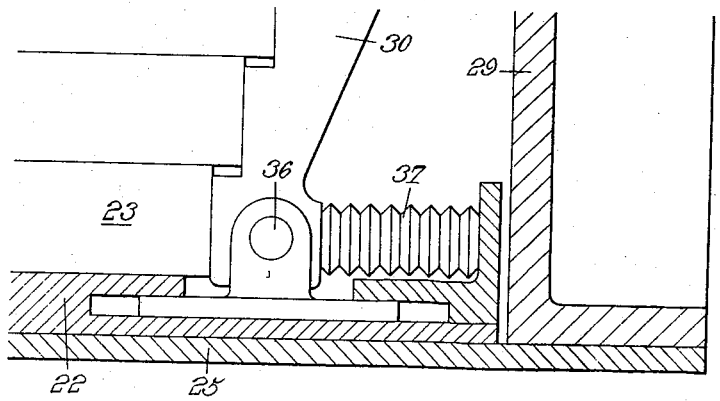
Figs. 7 and 8 show on an enlarged scale details of Fig. 1.

Girders 30 are for instance connected with plate 22, through hinges 36 slidable with respect to plate 22 and subjected to the action of springs 37 (Fig. 7). The degree of elasticity supplied by springs 37 serves to make allowance for expansions other than thermal expansion, differences of temperature between the graphite and the support and possible errors in the expansion coefficients.

Girders 31 are themselves pushed toward the block by springs 38 bearing upon the framework of the shield.

Figure 8:
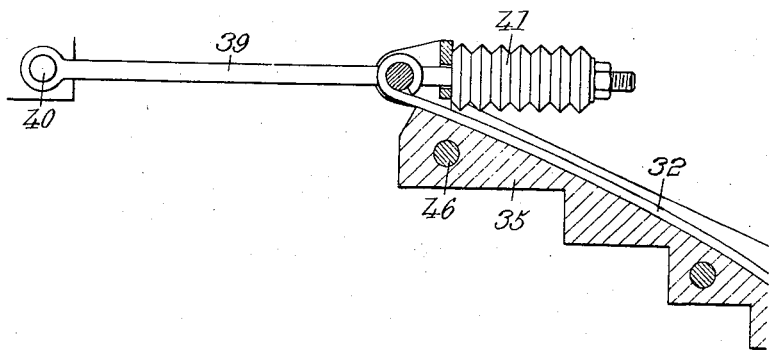

Finally, the upper ends of tie members 32 are fixed, through springs 41, with tie-rods 39 hinged at 40 (Fig. 8).

In view of the fact that the portion of every plate 22 located in the longitudinal vertical plane of symmetry of the block is prevented from moving transversely by a suitable engagement, the characteristics of the belts which have just been described permit only symmetrical expansions in the transverse direction.

In order to prevent the symmetrical expansions with respect to gap 4 in the longitudinal direction from being disturbed by the metallic support, the elements of tables 26 and 27 are supported by bearing elements 42, 43 and 44 so as to be able to have displacements parallel to the axis of the block, and the elements of two adjacent tables are interconnected by rods 45 the thermal coefficient of expansion of which is substantially the same as that of graphite. In these conditions, the metallic support will merely accompany the symmetrical longitudinal expansions of the lower portion of the graphite block without creating undesirable strains.

The belts are themselves interconnected from place to place by rods 46 of the same kind as rods 45. Rods 46, the elongation of which is about the same as that of the peripheral graphite bars of the reflector, cooperate in ensuring a good cohesion of the graphite block without introducing undesirable strains therein.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In a nuclear reactor which includes a graphite block formed by a plurality of juxtaposed contiguous parallel rows of horizontal graphite bars disposed end to end in pairs which are in line with one another, with an interval between their adjacent ends, said rows forming the block, all the intervals in said pairs of rows of bars being in register so as to form a vertical gap extending transversely to said block, said block being provided with a plurality of horizontal channels parallel to said rows of bars for housing slugs of fissionable material, said reactor further including a shielding structure fixed to the ground surrounding said graphite block; a plurality of struts interposed between the rows of bars disposed on opoposite sides of said gap respectively, and resilient means interposed between said shielding structure and the ends of said rows located near said shielding structure, said resilient means being strong enough to overcome the friction forces existing between the bars of each row and the rows of bars adjoining said row.

2. A nuclear reactor according to claim 1 in which said struts are made of beryllium.

3. A nuclear reactor according to claim 1 in which said struts are made of zirconium.

4. A nuclear reactor according to claim 1 in which the contacting surfaces of two adjoining graphite bars are provided with registering grooves of semi-circular cross-section forming together a channel for a uranium bar.

5. A nuclear reactor according to claim 1 in which every strut bears on either side against the ends of at least two graphite bars.

6. A nuclear reactor according to claim 1 in which said struts consist of small bars having their ends of small cross-section engaged into the graphite bars and including transverse plates near said ends of an area greater than the cross-section of said strut bars.

7. A nuclear reactor according to claim 1 in which said resilient means are leaf springs.

8. A nuclear reactor according to claim 1 further including hollow telescopic devices extending between the ends of said graphite block and the outside, said resilient means being incorporated in said telescopic devices.

9. A nuclear reactor according to claim 8 in which each of said telescopic devices includes two swivel joints.

10. A nuclear reactor according to claim 1 in which the means for supporting the graphite block on the ground are arranged to permit small displacements of said graphite bars with respect to said gap in a direction parallel to said graphite bars.

11. A nuclear reactor according to claim 1 in which the means for supporting said graphite block on the ground are arranged to permit small displacements of the elements of said block starting from the longitudinal vertical plane of symmetry of the block in a direction at right angles to the graphite bars.

12. A nuclear reactor according to claim 1 in which at least part of said means for supporting the graphite block on the ground are made of a material the coefficient of thermal expansion of which is close to that of graphite.

13. A nuclear reactor according to claim 1 further including elastic belt means disposed in planes transverse to said graphite bars for holding the whole of said bars.

14. A nuclear reactor according to claim 1 further including elastic belt means disposed in planes transverse to said graphite bars for holding the whole of said bars, and graphite bars, perpendicular to said graphite block, disposed in stepped fashion between said belts and said block.

15. A nuclear reactor according to claim 13 further including longitudinal bars for interconnecting said belts, said longitudinal bars being made of a material having its coefficient of thermal expansion close to that of graphite.

16. A graphite moderator of the gap type for nuclear reactors, comprising a graphite block divided by a transverse gap into two equal half-blocks, each of said half-blocks consisting of a plurality of parallel juxtaposed and superposed inner and outer rows of horizontal graphite bars, confronting the rows of the other half-block, the inner bars forming channels for receiving fuel elements, means supporting said block on the ground and having substantially the same thermal expansion coefficient as said graphite, a shielding structure enclosing said block and having openings for charging fuel elements into said channels, struts in said gap maintaining the spaced relationship of the graphite bars forming the gap, said struts being made of a member of the group consisting of zirconium and beryllium, first spring means between the outer ends of said outer bars and said shielding structure, hollow telescoping tubes bearing against said inner bore and connecting said channels with said openings, and second spring means between said shielding structure and said inner bars and surrounding at least one of said telescoping tubes, said first and second spring means being strong enough to overcome the friction forces between the bars of each row and between adjoining rows, and said struts and spring means preventing changes in the width of said gap due to expansion and contraction of the graphite bars.

References Cited in the file of this patent

UNITED STATES PATENTS

| 1,546,556 | Scheying | July 21, 1925 |
| 2,261,397 | Miller | Nov. 4, 1941 |
| 2,656,717 | Fourmanoit | Oct. 27, 1953 |
| 2,708,656 | Fermi et al. | May 17, 1956 |
| 2,790,760 | Powell | Apr. 30, 1957 |
| 2,803,601 | Cooper | Aug. 20, 1957 |

OTHER REFERENCES

Selected Reference Material, United States Atomic Energy Program Research Reactors TID 5275; Library date Oct. 10, 1955; pp. 385–393, 404, 405, 424. (Copy in Div. 46.)

Nuclear Engineering, part 1, Chemical Engineering Progress Symposium Series No. 11 (1954), vol. 50, published by American Institute of Chemical Engineers, N.Y. 17, N.Y., pp. 223–225.